March 23, 1926.
B. KARASIEWICZ
1,577,530
BRAKE LINING FASTENER FOR AUTOMOBILE BRAKES
Filed March 26, 1925
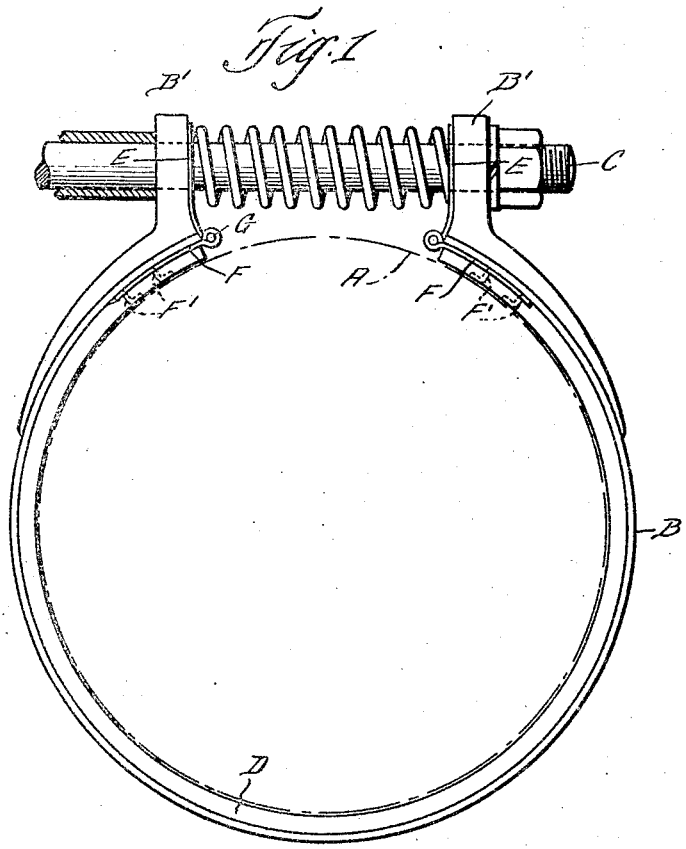
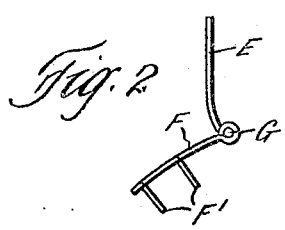
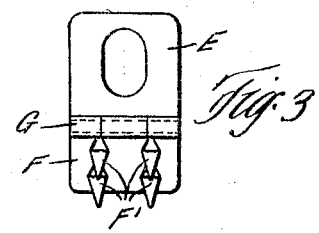
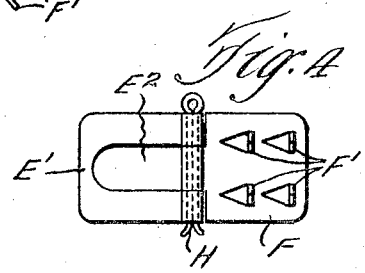

Patented Mar. 23, 1926.

1,577,530

UNITED STATES PATENT OFFICE.

BRONISLAW KARASIEWICZ, OF CLEVELAND, OHIO.

BRAKE-LINING FASTENER FOR AUTOMOBILE BRAKES.

Application filed March 26, 1925. Serial No. 18,337.

*To all whom it may concern:*

Be it known that I, BRONISLAW KARASIEWICZ, a citizen of the United States, residing at Cleveland, in the county of Cuyahoga and State of Ohio, have invented a certain new and useful Improvement in Brake-Lining Fasteners for Automobile Brakes, of which the following is a full, clear, and exact description, reference being had to the accompanying drawings.

This invention relates generally to automobile brakes and more particularly to the manner of securing the lining.

Heretofore, so far as I am aware, brake linings which are usually of fabric construction are riveted or otherwise permanently secured to the metallic band which is contracted to bring it into contact with the brake drum. Whenever this brake lining wears out it is necessary to file off or otherwise remove the rivets and then rivet the new lining to the band.

The object of my invention is to provide means for holding the brake lining in proper position without the necessity of riveting the lining to the brake band thereby saving time and labor both in the original application of the lining and also in the removal and replacement thereof.

With this object in view my invention consists in the novel features of construction, combination and arrangement all of which will be fully described hereinafter and set forth in the appended claims.

In the drawings forming a part of this specification, Fig. 1 is a view showing the practical application of my invention; Fig. 2 is a side elevation of my improved device for supporting the brake lining and Fig. 3 is a front elevation of the same; Fig. 4 is a detail view of a modified form of hanger.

Referring to the drawings, A indicates the usual construction of brake drum and B the brake band surrounding the same having terminals B' through which the actuating bolt C passes. D indicates the brake lining which in this instance is free from the brake band but occupies the same relative position as heretofore, that is the space between the band proper and the circumference of the brake drum.

Instead of being riveted to the brake band, as heretofore, I provide each end of the brake lining with my improved hanger or support consisting of an apertured member E and a member F having integral tongues F' punched therefrom and which are forced through the brake lining and turned down in order to securely connect the brake lining to the hanger or support. The members E and F are hinged together at G so as to give a limited amount of play between the members.

The actuating bolt C passes through the apertured members as shown and this aperture is somewhat elongated so that the bolt can be readily passed therethrough and the terminals of the band have their proper movements without producing any binding action. The apertured members E are arranged in contact with the terminals of the band as shown and moved in unison therewith.

By this arrangement, the brake lining is properly supported and functions in exactly the same way as though it were permanently connected to the brake band. By having the lining supported, as shown and described, it is obvious that this lining can be quickly and easily removed whenever desired and replaced without the necessity of removing and replacing rivets.

Furthermore, it will only be necessary to disconnect the hangers or supports from the bolt thereby avoiding the necessity of removing the brake band also.

Instead of employing an apertured plate E, I may employ the plate E' with a slot $E^2$, this slotted plate being pivotally connected to the plate F by means of a cotter pin H. By means of this construction it will not be necessary to remove the actuating bolt but by detaching the cotter pins, the brake lining with the members F can be detached, the members F disconnected from the brake lining ends and applied to a new lining which is replaced and the members F pivotally connected again to the slotted plates E' which are permitted to remain astride of the actuating bolt.

It will thus be seen that I provide a simple and highly efficient means for arranging and maintaining the brake lining properly positioned, with reference to both the band and drum.

It will also be understood that my improved hanger can be employed for supporting the lining of Ford transmissions as well as for brake linings.

Having thus described my invention, what I claim is:

1. The combination with a brake drum and band, an actuating bolt passing through the terminals of said band, of a brake lining interposed between the drum and band, hangers detachably connected to the ends of the band, said hangers being supported upon the actuating bolt, each hanger comprising an apertured member and a member provided with integral fastening tongues, said members being pivotally connected together.

2. A brake lining having hangers connected to the ends thereof, each hanger comprising a member having tongues punched therefrom and a second member hinged to the first named member and having an opening through which the supporting bolt is adapted to pass.

3. As a new article of manufacture, a brake lining hanger comprising two members and a pin hingedly securing said members together, one of said members having a slot therein and the other member having tongues punched therefrom adapted to be forced through a brake lining and turned down thereover to securely fasten said hanger to a brake lining.

4. As a new article of manufacture, a brake lining hanger comprising two members pivotally connected together, one member having an aperture therein and the other member having tongues punched therefrom adapted to be forced through a brake lining and turned down thereover to securely connect the hanger to the brake lining.

5. The combination with a brake band and an actuating bolt passing through the terminals of said band of a brake lining, means for detachably securing said lining within said brake band comprising a brake lining hanger consisting of a pair of members pivotally connected together, one of said members having a slot therein, the other member having tongues formed integral therewith and projecting therefrom, said tongues adapted to be forced through said lining and bent down thereover to securely fasten the brake lining to the hanger, the slotted portion of said hanger adapted to receive said actuating bolt therethrough whereby said lining is supported within said brake band.

In testimony whereof, I hereunto affix my signature.

BRONISLAW KARASIEWICZ.